United States Patent [19]
Dieter-Schneider et al.

[11] 3,764,735
[45] Oct. 9, 1973

[54] METHOD AND ARRANGEMENT FOR FURNISHING A CORRECTING OF ERRORS IN THE REGISTRATION OF RASTERS IN COLOR TELEVISION CAMERAS

[75] Inventors: Hans Dieter-Schneider, Gross-Gerau; Georg Treusch, Unter-Ostern; Christian Sacher, Eberstadt, all of Germany

[73] Assignee: Robert Bosch Fernsehanlagen GmbH, Darmstodt, Germany

[22] Filed: Sept. 7, 1972

[21] Appl. No.: 286,707

[30] Foreign Application Priority Data

Sept. 7, 1971 Germany .................. P 21 44 744.9

[52] U.S. Cl. .................................. 178/5.4 M
[51] Int. Cl. .................................. H04n 9/08
[58] Field of Search .......................... 178/5.4 M

[56] References Cited

UNITED STATES PATENTS 3,700,790 10/1972 Ryley ............................ 178/5.4 M

*Primary Examiner*—Robert L. Richardson
*Assistant Examiner*—George G. Stellar
*Attorney*—Michael S. Striker

[57] ABSTRACT

Red, green and blue color signals are doubly limited and amplified. A switching stage furnishes these signals to horizontal and vertical channels for effecting horizontal and vertical raster registration correction. The correction relative to the white (green) raster is made by furnishing first pulses in response to discontinuities in the color signals, triggering first and second monostable circuit means with the first pulses, the monostable circuit triggered by the white signal furnishing broad second pulses having a pulse width twice the pulse width of the narrow second pulses furnished by the second monostable circuit means. Third and fourth monostable circuit means then furnish primary and secondary third pulses in response to the trailing edge of the broad and narrow second pulses. The positive components of a first difference signal formed by taking the difference between the broad second pulses and the secondary third pulses are then added to the negative components of a second difference signal formed by subtracting the secondary third pulses from the primary third pulses. The resultant signal, after integration, is used as the correction signal.

12 Claims, 2 Drawing Figures

METHOD AND ARRANGEMENT FOR FURNISHING A CORRECTING OF ERRORS IN THE REGISTRATION OF RASTERS IN COLOR TELEVISION CAMERAS

BACKGROUND OF THE INVENTION

The present invention relates to a method and arrangement for furnishing a correction signal for the automatic correction of raster registration errors in color television cameras having a plurality of pick-up tubes. The pick-up tubes include a pick-up tube having a high resolution. The raster generated by the high resolution pick-up camera furnishes as a reference raster, the remaining rasters being corrected to achieve registration therewith.

It is a major problem in color television cameras to achieve coincidence of the scanning rasters of the pick-up tubes and to maintain this coincidence or registration over long periods of time. A manual adjustment of the raster registration is of course possible, but requires a great deal of time and well trained personnel. For these reasons it is desirable that this registration correction be carried out automatically. Some automatic arrangements are known and comprise an error detection arrangement for recognizing registration errors, (for example in the form of transit time error detection) as well as a correction storage wherein corresponding correction signals are entered and whose signals then control the adjustment means for the raster registration. These known arrangements have the disadvantage that they process analog signals and are therefore relatively expensive.

SUMMARY OF THE INVENTION

It is an object of the present invention to disclose a method and arrangement for furnishing a correction signal, for effecting, automatically, correct raster registration in color television cameras having a plurality of pick-up tubes. In particular, the present system is to operate on a digital basis.

The present invention comprises a means and method for generating an error signal for automatically correcting raster registration errors in a television camera, wherein a plurality of color signals and corresponding rasters are furnished, said rasters including a reference raster. The method comprises the steps of limiting the color signals, said so limited color signals having amplitude discontinuities. It further comprises generating broad and narrow pulses of determined pulse width in response to said discontinuities, the broad pulses being generated in response to discontinuities in the color signals whose associated raster is the reference raster. Next, primary and secondary third pulses having a pulse width corresponding to the pulse width of the broad pulses are furnished, each in response to the trailing edge of a narrow or broad pulse. A first difference signal constituting a difference between said broad pulses and said secondary third pulses is formed. A second difference signal constituting the difference between the primary third pulses and the secondary third pulses is also formed, the positive components of the first difference signal being combined with the negative components of the second difference signal to form a sum signal. The sum signal is then low pass filtered, the resulting signal constituting the correction signal.

It is the advantage of the method and arrangement of the present invention that only little additional equipment is required in order to achieve a much more exact raster registration, said raster registration being further independent of the skills of the operator.

It is necessary that only color signals corresponding to a sharp and/or relatively uncolored picture are utilized for the method and arrangement of the present invention. For this purpose a signal analyzer is provided to block the transmission of the limited color signals to the correction channels when the quality of said signals is not adequate for the purpose intended.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
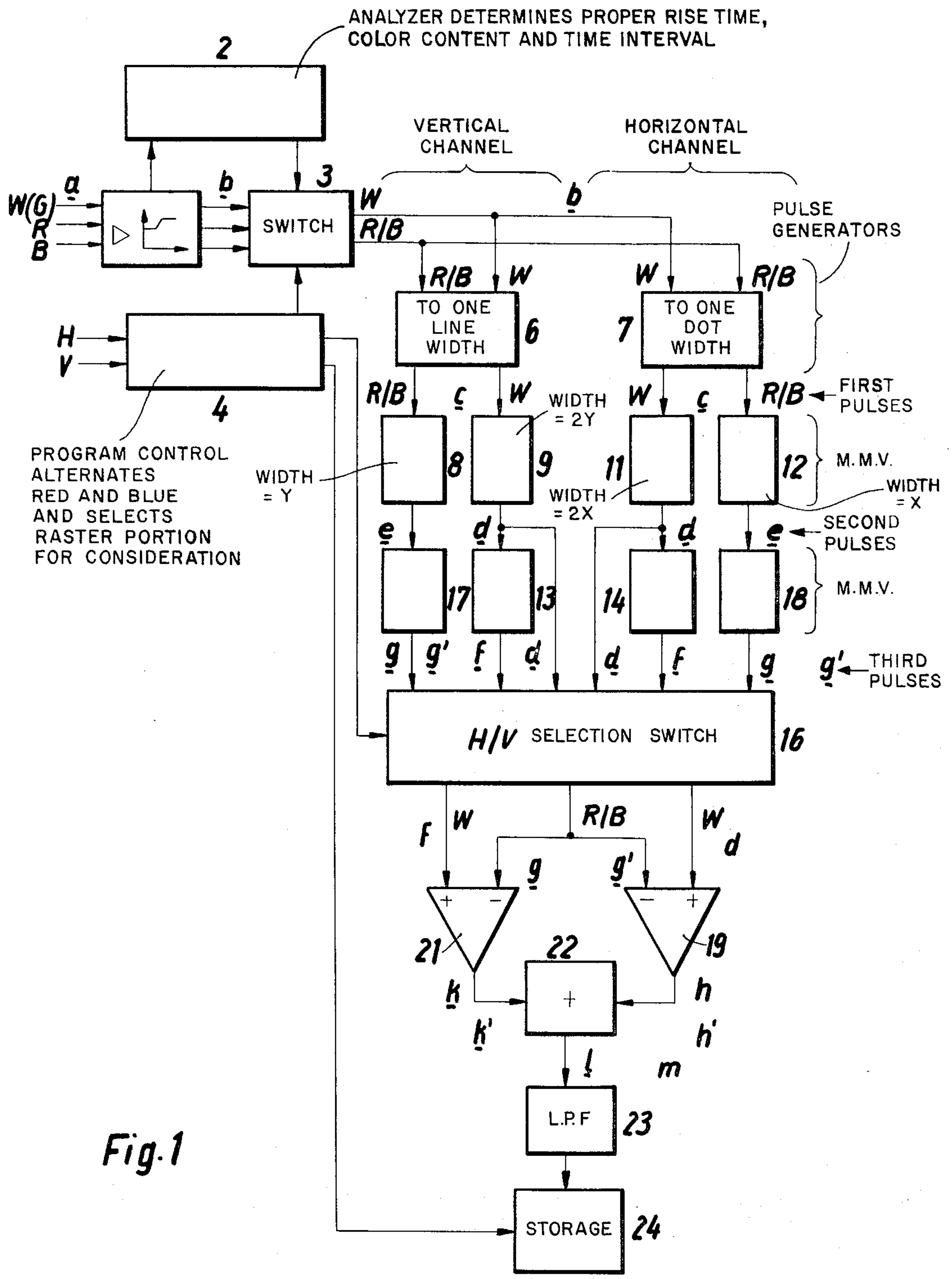
FIG. 1 is a circuit arrangement in accordance with the present invention.

A preferred embodiment will now be described with reference to the drawing.

The color signals generated in the camera tubes are designated by a in FIG. 1 and comprise the color signals for white (green), red and blue. These are applied to a signal forming stage 1 in which they are amplified and then doubly amplitude limited. Thus, from each color signal *a* a signal portion *b* is extracted, which corresponds to those portions of signals a occurring between a first and second predetermined amplitude (designated by O and U in FIG. 2). The so generated signals *b* are furnished both to an analyzer 2 and further to switch means 3. It is the purpose of analyzer 2 to analyze the so applied signals to determine whether the signals are sufficiently sharp, that is whether their rise times are sufficiently short, and whether the picture has a high or low color content. Further it is determined in the analyzer whether the interval between sequential color signals is sufficiently high to allow the circuit to be described below to operate properly. Only if all three criteria are met, that is if the rise times of the color signals are sufficiently low, the color content is sufficiently low and the repetition rate is sufficiently low does analyzer 2 allow switch stage 3 to become conductive.

Besides its control via analyzer 2, switch stage 3 is also controlled by programming signals furnished by program means 4. The program means operate to permit transmission of the white (green) color signals to a first output of switch means 3 and alternate transmission of the red and blue signals to the second switch output of switch means 3. Further, it is a function of the program means to determine that the time instants at which switch means 3 are conductive, correspond to color signals derived from different portions of the corresponding rasters as follows. It is assumed that the raster is divided into a first, second and third vertical portion for controlling the position of the raster in the horizontal direction and into a first, second and third horizontal portion for controlling the raster position in the vertical direction. For creating a correction signal for changing the position of the raster in the horizontal direction the second (middle) vertical raster section is utilized, for changing the size of the raster in the horizontal direction the third (rightmost) vertical raster portion is utilized, for a repositioning of the raster in the horizontal position the left (first) vertical raster section is utilized, while for changing the linearity of the raster in the horizontal direction the middle vertical portion is again evaluated. Similarly, the movement of the raster in the vertical direction, its size in the vertical direction and its linearity in the vertical direction are carried out on the basis of signals derived from the middle, lower and the upper horizontal raster portions, respectively. The raster portion selection is accomplished in a known manner by one-shot multivibrators having time constants of one-third line and one-third field duration which are triggered with horizontal and vertical pulses. The particular raster section is then determined by counting output pulses of these one-shot multivibrators with ring counters in a predetermined sequence.

Figure 2:
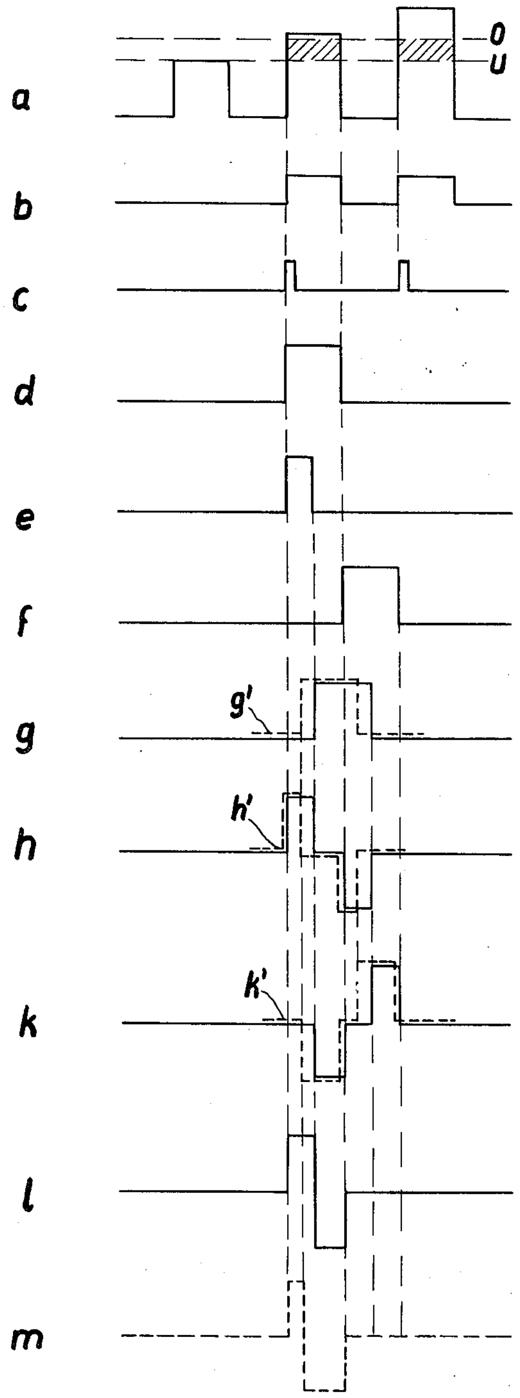
FIG. 2 shows timing diagrams of the signals appearing at different points in the circuit of FIG. 1.

The signals at the first and second output of the switch stage 3, namely the white signal and the red and blue signals alternatively, respectively, are then fed to an H channel for furnishing correction signals in the horizontal direction and a V channel for furnishing correction signals in the vertical direction. The H and V channels being substantially identical, the vertical channel will now be described in detail. It comprises first a converter 6 which converts the red and blue signals on the one hand and the white signals on the other hand into first pulses, denoted by *c* in FIGS. 1 and 2. These first pulses have a pulse width substantially equal to line duration. (In the corresponding converter in the horizontal channel, namely converter 7, the generated first pulses have a pulse width corresponding to the persistence time of a dot on the screen.) The first pulses *c*, trigger a first and second monostable multivibrator, reference numerals 9 and 8, respectively. The pulse width associated with monostable multivibrator 9 is approximately double the pulse width associated with monostable multivibrator 8. Similarly, monostable multivibrator 11 (which receives the white first pulses) has a pulse width which is approximately twice the pulse width associated with monostable multivibrator 12. At the output of monostable multivibrator 9 broad second pulses are furnished *d* while at the output of monostable multivibrator 8 narrow second pulses *e* are furnished. The trailing edge of the broad and narrow second pulses then respectively trigger third and fourth monostable multivibrator means, namely monostable circuits 13 and 17, respectively. The signals appearing at the outputs of stages 13 and 17, respectively are herein referred to as primary and secondary third pulses. It will be noted that the primary third pulse has the same pulse width as the broad second pulse and has a leading edge substantially coinciding with the trailing edge of said second pulse. The secondary third pulse appearing at the output of monostable multivibrator 17 also has a pulse width equal to the pulse width of the broad second pulse, but is triggered by the trailing edge of the narrow second pulse. If the raster registration is correct, the secondary third pulse will have the shape indicated as *g*, while if the raster registration is incorrect, the timing of the pulse will as indicated at *g'* in FIG. 2. Signals *d*, *f* and *g* (or *g'*) are then applied to a horizontal/vertical switch, which under control of program means 4 alternately connects the horizontal and vertical channel to the remaining circuitry which will be described below. The H/V switch is thus a time sharing device. The remaining circuitry in FIG. 1 then comprises a first and second difference amplifier, labeled 19 and 21, respectively. Each has a positive and negative input, the negative input in both cases being the above-described signals *g* (or *g'* in the case of poor raster registration). The positive input of difference amplifier 19 receives the broad second pulse, that is pulse *d*, while the positive input of the second difference amplifier is the primary third pulse, namely signal *f* described above. In each case, the difference amplifier furnishes an output signal (*h*, *k*, respectively) which corresponds to the difference between the signals applied at the two inputs. In FIG. 2, the signal *h* applies to correct raster registration while the signal *h'* signifies poor raster registration. Similarly, the signal *k* is obtained under good and the *k'* under poor raster registration conditions. The first and second difference signals, namely *h* and *k*, respectively are then applied to the inputs of a summing amplifier 22 which adds the positive portions of the pulses *h* or *h'* to the negative portions of the pulses *k* or *k'*. The resulting sum signal furnished at the output of summing amplifier 22 and designated by 1 in the drawing indicates the signal furnished under conditions of good raster registration, while the sum signal *m* is obtained under conditions of poor raster registration. The sum signal is then filtered by a low pass filter 23, the so filtered signal being the final correction signal which is stored in the storage means 24 under control of programming signals furnished by program means 4. The so stored signals are then used to carry out the correction required to effect good raster registration. It should be noted that the correction signal furnished by the present invention is 0 under conditions shown in line 1 of FIG. 2, and has a negative value under the conditions shown in line *m* of FIG. 2. Of course, positive correction signals are furnished when the registration error is in the opposite direction from that assumed in the present example.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a TV camera having color signal furnishing means each furnishing color signals within a corresponding raster, said rasters including a reference raster, a method for furnishing a correction signal for correcting the registration of said rasters relative to said reference raster, comprising, in combination, the steps of limiting the amplitude of said color signals to an amplitude range between a first and second predetermined amplitude, thereby creating limited color signals having amplitude discontinuities; creating a plurality of first pulses, each in response to one of said amplitude discontinuities; creating second pulses having predetermined pulse width in response to said first pulses, said second pulses including broad second pulses associated with said reference raster and narrow second pulses, each of said broad and narrow second pulses having a trailing edge; creating primary and secondary third pulses having a pulse width corresponding to the pulse width of said broad second pulses in response to the trailing edges of said broad and narrow second pulses, respectively; creating first difference signals corresponding to the difference in amplitude between said broad second pulses and said secondary third pulses, said first difference signal having positive and negative components; creating second difference signals corresponding to the difference between said primary and secondary third pulses, said second difference signals having positive and negative components; creating a sum signal having positive components corresponding to the positive components of said first difference signal and negative components corresponding to the negative components of said second difference signal; and integrating said sum signal thereby creating said correction signal.

2. A method as set forth in claim 1, wherein said correction signal comprises a horizontal correction signal for horizontal deflection correction and a vertical correction signal for vertical deflection correction; and wherein the width of said first pulses when creating said horizontal correction signal is approximately equal to the persistence time of an image spot.

3. A method as set forth in claim 1, wherein said correction signal comprises a horizontal correction signal for horizontal deflection correction and a vertical deflection signal for vertical deflection correction; and wherein the pulse width of said first pulses when used for creating said vertical correction signal substantially equal to a line duration.

4. A method as set forth in claim 1, further comprising the step of analyzing said color signals and creating said correction signal only in the presence of color signals indicative of a sharp and low color content picture.

5. A method as set forth in claim 1, wherein each of said rasters has a first, second and third vertical section respectively corresponding to the beginning, middle and end portion of the corresponding horizontal sweep; wherein furnishing a correction signal comprises furnishing, in time sequence, a first horizontal correction signal for correcting the position of said raster in the horizontal direction, a second horizontal correction signal for correcting the size of said raster in the horizontal direction, a third horizontal correction signal for recorrecting the position of said raster in the horizontal direction, and a fourth horizontal correction signal for correcting the linearity of said raster in the horizontal direction; and wherein said color signals are derived from said second, third, first and second vertical sections, respectively when creating said first, second, third and fourth horizontal correction signals.

6. The method as set forth in claim 1, wherein said television camera furnishes vertical sweep signals; wherein said rasters have a first, second and third horizontal section respectively corresponding to the beginning, middle and end of said vertical sweeps; wherein furnishing said correction signals comprises furnishing a first, second and third vertical correction signal in time sequence, for respectively correcting the position, size, and linearity of said raster in the vertical direction; and wherein said color signals are derived from said second, third and first horizontal section when creating said first, second and third vertical correction signals, respectively.

7. In a color television camera having at least a first and second pick-up tube respectively furnishing first and second color signals and a first and second raster, a system for furnishing a correction signal for automatically correcting the registration of said first and second rasters, comprising, in combination, amplifying means for amplifying and limiting said first and second color signals; program means furnishing programming signals; switch means having a first and second switch output, connected to said amplifying means and said program means, for furnishing, under control of said programming signals, selected ones of said first color signals at said first switch output and selected ones of said second color signals at said second switch output; converter means connected to said first and second switch outputs for furnishing primary and secondary first pulses in response to discontinuities in said first and second selected and limited color signals, respectively; first and second monostable circuit means connected to the output of said converter means for furnishing broad and narrow second pulses in response to said primary and secondary first pulses, respectively, said broad pulses having a predetermined pulse width relative to said narrow pulses; third and fourth monostable circuit means respectively connected to the output of said first and second monostable circuit means, for furnishing primary and secondary third pulses respectively, in response to the trailing edges of said broad and narrow second pulses, respectively, said primary and secondary third pulses having a pulse width substantially equal to the pulse width of said broad second pulses; first difference amplifier means having a first and second input respectively connected to the output of said first and second monostable circuit means, for furnishing a first difference signal corresponding to the difference therebetween; second difference amplifier means connected to the output of said third and fourth monostable circuit means, for furnishing a second difference signal corresponding to the difference therebetween, said first and second difference signals each having a positive and a negative portion; and summing amplifier means connected to the outputs of said first and second difference amplifier means, for adding said positive portion of said first difference signal to said negative portions of said negative difference signals, thereby creating a sum signal, said so created sum signal constituting said correction signal.

8. An arrangement as set forth in claim 7, further comprising low pass filter means connected to the output of said summing amplifier means.

9. An arrangement as set forth in claim 8, wherein said correction signal comprises a horizontal correction signal for correcting the registration of said raster in the horizontal direction and a vertical correction signal for correcting the registration of said raster in the vertical direction; wherein said converter means and said first, second, third and fourth monostable circuit means are horizontal converter and monostable circuit means; further comprising corresponding vertical converter and monostable circuit means; and H/V switch means connected to said program means and to said third and fourth horizontal and vertical monostable circuit means for alternatively connecting said third and fourth horizontal or said third and fourth vertical monostable circuit means to the inputs of said first and second difference amplifying means under control of said programming signals.

10. An arrangement as set forth in claim 8, wherein said first and second color signals are respectively, green and red color signals; further comprising third puck-up tube means furnishing blue color signals.

11. An arrangement as set forth in claim 10, wherein said switch means comprise means for furnishing said green color signals at first switch output, and said red and blue color signals at said second switch output in response to said programming signals.

12. An arrangement as set forth in claim 7, further comprising signal analyzer means connected to said amplifying means and said switch means for blocking said switch means in the presence of signals having excessive rise times or excessive color content.

* * * * *